(12) United States Patent
Zhou

(10) Patent No.: US 9,304,244 B1
(45) Date of Patent: Apr. 5, 2016

(54) LIGHT GUIDE PLATE, BACKLIGHT MODULE, AND LIQUID CRYSTAL DISPLAY DEVICE

(71) Applicant: Shenzhen China Star Optoelectronics Technology Co., Ltd., Shenzhen, Guangdong (CN)

(72) Inventor: Gege Zhou, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 14/420,900

(22) PCT Filed: Dec. 15, 2014

(86) PCT No.: PCT/CN2014/093848
§ 371 (c)(1),
(2) Date: Feb. 10, 2015

(51) Int. Cl.
*G02B 6/10* (2006.01)
*F21V 8/00* (2006.01)

(52) U.S. Cl.
CPC ............ *G02B 6/0046* (2013.01); *G02B 6/0035* (2013.01); *G02B 6/0096* (2013.01)

(58) Field of Classification Search
CPC .. G02B 6/0028; G02B 6/0046; G02B 6/0096; F21V 2200/40
USPC .................................. 362/610, 621; 385/146
See application file for complete search history.

(56) References Cited

U.S. PATENT DOCUMENTS

| | | | |
|---|---|---|---|
| 2003/0086680 A1* | 5/2003 | Saccomanno | 385/146 |
| 2014/0104884 A1* | 4/2014 | Yan et al. | 362/621 |

* cited by examiner

*Primary Examiner* — Karabi Guharay
(74) *Attorney, Agent, or Firm* — Andrew C. Cheng

(57) ABSTRACT

A light guide plate includes a light exit surface, a light guide plate bottom surface, and at least one light incidence surface. The light exit surface and the light guide plate bottom surface are opposite to each other. The light incidence surface is connected to the light exit surface and the light guide plate bottom surface. The light guide plate is of a wedge configuration and has an end that is close to the light incidence surface and has a thickness greater than a thickness of an end thereof distant from the light incidence surface. The light guide plate includes a hollow wedge cavity that includes a hollow wedge cavity bottom surface adjacent to the light guide plate bottom surface. The hollow wedge cavity receives therein a reflector plate laminated on the hollow wedge cavity bottom surface and having a surface facing the light exit surface and including reflection projections.

18 Claims, 2 Drawing Sheets

LIGHT GUIDE PLATE, BACKLIGHT MODULE, AND LIQUID CRYSTAL DISPLAY DEVICE

CROSS REFERENCE TO RELATED APPLICATIONS

This application claims the priority of Chinese Patent Application No. 201410721062.1, entitled "Light Guide Plate, Backlight Module, and Liquid Crystal Display Device", filed on Dec. 2, 2014, the disclosure of which is incorporated herein by reference in its entirety.

BACKGROUND OF THE INVENTION

1. Field of the Invention

The present invention relates to the field of displaying technology, and in particular to a light guide plate, a backlight module, and a liquid crystal display device.

2. The Related Arts

In the known liquid crystal displays, a side-edge backlight module is often composed of a light guide plate, a reflector plate arranged on a bottom surface of the light guide plate, and a light source arranged at a lateral side of the light guide plate. In the side-edge backlight module, light emitting from the light source transmits through the lateral side of the light guide plate to get into the light guide plate. The light is subjected to reflection by the light guide plate and grid dots formed on the bottom surface of the light guide plate to have a portion of the light project out of a front surface of the light guide plate, while a remaining portion of the light is reflected toward a surface of the bottom reflector plate to be reflected by the bottom reflector plate back into the light guide plate and then further reflected to project out of the front surface of the light guide plate. Further, the light that projects out of the front surface of the light guide plate is subjected to diffusion and convergence of a film arranged atop the light guide plate so as to make an optic image homogeneous and sufficient central brightness of the image. The optical film is generally a prism film and/or a brightness enhancement film.

In the prior art, the light guide plate is often made of polymethyl methacrylate (PMMA), of which light transmittance of 92% and refractive index is 1.49. Thus, when light passing through the light guide plate, an amount of 8% of the light energy is absorbed by the light guide plate and gets lost, making the image brightness lowered down. The lost light energy can only be supplemented by using optic films of which the gain is increased to around 10% and this increases the manufacturing cost.

SUMMARY OF THE INVENTION

A light guide plate, a backlight module, and a liquid crystal display device, which have reduced loss of light energy, high brightness, and a low manufacturing cost, are provided.

A light guide plate comprises a light exit surface, a light guide plate bottom surface, and at least one light incidence surface. The light exit surface and the light guide plate bottom surface are opposite to each other. The light incidence surface is connected to the light exit surface and the light guide plate bottom surface. The light guide plate is of a wedge configuration. The light guide plate has an end that is close to the light incidence surface and has a thickness greater than a thickness of an end thereof distant from the light incidence surface. The light guide plate further comprises a hollow wedge cavity. The hollow wedge cavity comprises a hollow wedge cavity bottom surface that is adjacent to the light guide plate bottom surface. The hollow wedge cavity of the light guide plate receives therein a reflector plate. The reflector plate is laminated on the hollow wedge cavity bottom surface. The reflector plate has a surface facing the light exit surface and comprising reflection projections formed thereon.

Further, the hollow wedge cavity further comprises a hollow wedge cavity side surface adjacent to the light incidence surface. The hollow wedge cavity side surface comprises at least one light guide projection projecting inwardly of the hollow wedge cavity.

Further, the light guide projection and the light guide plate are integrally formed together.

Further, the light guide projection is one of a hemisphere, a polygonal pyramid, and a polyhedron.

Further, the light guide projection is a hemisphere. The hemisphere has a diameter of 50 micrometers to 60 micrometers.

Further, the hollow wedge cavity has a thickness greater than or equal to 2 millimeters.

Further, the light guide plate is made of polymethyl methacrylate.

Further, the light guide plate bottom surface of the light guide plate is provided with a reflection layer.

A backlight module comprises a light guide plate. The light guide plate comprises a light exit surface, a light guide plate bottom surface, and at least one light incidence surface. The light exit surface and the light guide plate bottom surface are opposite to each other. The light incidence surface is connected to the light exit surface and the light guide plate bottom surface. The light guide plate is of a wedge configuration. The light guide plate has an end that is close to the light incidence surface and has a thickness greater than a thickness of an end thereof distant from the light incidence surface. The light guide plate further comprises a hollow wedge cavity. The hollow wedge cavity comprises a hollow wedge cavity bottom surface that is adjacent to the light guide plate bottom surface. The hollow wedge cavity of the light guide plate receives therein a reflector plate. The reflector plate is laminated on the hollow wedge cavity bottom surface. The reflector plate has a surface facing the light exit surface and comprising reflection projections formed thereon.

Further, the hollow wedge cavity further comprises a hollow wedge cavity side surface adjacent to the light incidence surface. The hollow wedge cavity side surface comprises at least one light guide projection projecting inwardly of the hollow wedge cavity.

A liquid crystal display device comprises a light guide plate. The light guide plate comprises a light exit surface, a light guide plate bottom surface, and at least one light incidence surface. The light exit surface and the light guide plate bottom surface are opposite to each other. The light incidence surface is connected to the light exit surface and the light guide plate bottom surface. The light guide plate is of a wedge configuration. The light guide plate has an end that is close to the light incidence surface and has a thickness greater than a thickness of an end thereof distant from the light incidence surface. The light guide plate further comprises a hollow wedge cavity. The hollow wedge cavity comprises a hollow wedge cavity bottom surface that is adjacent to the light guide plate bottom surface. The hollow wedge cavity of the light guide plate receives therein a reflector plate. The reflector plate is laminated on the hollow wedge cavity bottom surface. The reflector plate has a surface facing the light exit surface and comprising reflection projections formed thereon.

Further, the hollow wedge cavity further comprises a hollow wedge cavity side surface adjacent to the light incidence surface. The hollow wedge cavity side surface comprises at least one light guide projection projecting inwardly of the hollow wedge cavity.

The present invention provides a light guide plate, a backlight module, and a liquid crystal display device, which ensure most of light can be converted from side-edge incidence into outward emission from a front surface so as to reduce the consumption of material and also to lower down manufacturing cost. Since a hollow wedge cavity is formed in the light guide plate, when light enters the light guide plate through a light incidence surface of the light guide plate, the absorption of light energy by the material of the light guide plate is reduced so that the light emitting out of a light exit surface can be of increased brightness thereby increasing image brightness of a display device. Further, due to the reduced loss of light energy, it is possible to reduce the use of light concentration film thereby reducing the cost of a backlight module.

BRIEF DESCRIPTION OF THE DRAWINGS

To more clearly explain the technical solutions proposed in embodiments of the present invention and those of the prior art, a brief description of the drawings that are necessary for describing the embodiments is given as follows. It is obvious that the drawings that will be described below show only some embodiments of the present invention. For those having ordinary skills of the art, other drawings may also be readily available from these attached drawings without the expense of creative effort and endeavor.

DETAILED DESCRIPTION OF THE PREFERRED EMBODIMENTS

A clear and complete description will be given to technical solutions of the embodiments of the present invention with reference to the attached drawings of the embodiments of the present invention. However, the embodiments so described are only some, but not all, of the embodiments of the present invention. Other embodiments that are available to those having ordinary skills of the art without the expense of creative effort and endeavor are considered belonging to the scope of protection of the present invention.

Figure 1:
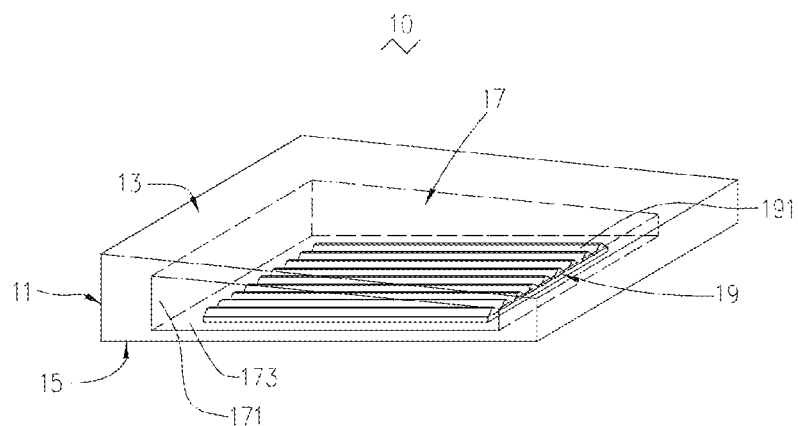
FIG. 1 is a schematic view showing the structure of a light guide plate according to a first preferred embodiment of the present invention.
Figure 2:
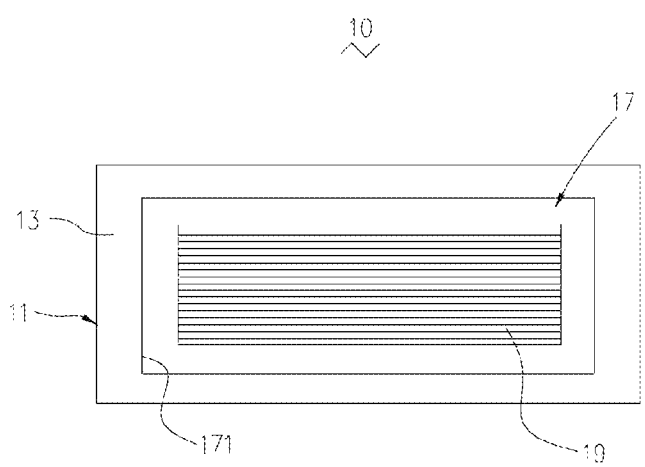
FIG. 2 is a top plan view of the light guide plate of FIG. 1.

Referring to FIGS. 1 and 2, a first preferred embodiment of the present invention provides a light guide plate 10, which comprises at least one light incidence surface 11, a light exit surface 13, and a light guide plate bottom surface 15. The light guide plate 10 has an interior forming a hollow wedge cavity 17. The light exit surface 13 and the light guide plate bottom surface 15 are respectively arranged on two opposite surfaces of the light guide plate 10. The light incidence surface 11 is connected to the light exit surface 13 and the light guide plate bottom surface 15. In use, light incident on the light incidence surface 11 is subjected to refraction and/or reflection by the hollow wedge cavity 17 and then emits outward through the light exit surface 13. In the instant embodiment, the light guide plate 10 is of a wedge configuration, which has an end, which is close to the light incidence surface 11, having a thickness greater than a thickness of an end thereof that is distant from the light incidence surface 11.

Further, the hollow wedge cavity 17 of the light guide plate 10 comprises a hollow wedge cavity side surface 171 corresponding to the light incidence surface 11 and a hollow wedge cavity bottom surface 173 connected to the hollow wedge cavity side surface 171. The hollow wedge cavity 17 has a contour that is substantially similar to that of the light guide plate 10. The hollow wedge cavity 17 has an end, which is closed to the light incidence surface 11, having a thickness that is greater than a thickness of an end thereof that is distant from the light incidence surface 11.

The light guide plate 10 further comprises a reflector plate 19. The reflector plate 19 is received in the hollow wedge cavity 17 and is arranged on a surface of the hollow wedge cavity 17 that is adjacent to the light guide plate bottom surface 15. Specifically, the reflector plate 19 is laminated on the hollow wedge cavity bottom surface 173 of the hollow wedge cavity.

In use, light entering the hollow wedge cavity 17 irradiates the reflector plate 19 so that the light is spread and diffused uniformly and then emits outward through the light exit surface 13. The reflector plate 19 is provided thereon with reflection projections 191. The reflection projections 191 can be dots, ridges, troughs, and the likes and light reflection and scattering thereof can be adjusted through adjusting surface roughness thereof. Specifically, the reflection projections 191 are arranged to point toward the light exit surface 13 of the light guide plate 10.

Further, the hollow wedge cavity 17 has a thickness that is greater than or equal to 2 millimeters. It is appreciated that to reduce manufacturing difficult of the hollow wedge cavity 17 and to achieve yield rate of manufacture of the hollow wedge cavity 17, it is preferred that the thickness of the hollow wedge cavity 17 is greater than 2 millimeters. It is appreciated that the thickness of the hollow wedge cavity 17 cannot be greater than thickness of the light guide plate 10.

Preferably, the light guide plate 10 is made of polymethyl methacrylate. It is appreciated that the light guide plate 10 can alternatively be made of other suitable materials, such as polycarbonate.

Further, the light guide plate bottom surface of the light guide plate 10 is provided with a reflection layer (not shown). The reflection layer is formed of Teflon or a material having a refractive index of 1 to 1.48.

In using the light guide plate 10 of the present invention, light that is incident on and transmits through the light incidence surface 11, is subjected to refraction and/or reflection by the hollow wedge cavity 17 and then, emits outward through the light exit surface 13. This ensures most of the light can be converted from the side-edge incidence into outward emission from the front surface so as to reduce the overall weight of the light guide plate 10 and the consumption of material in making the light guide plate 10. Since the hollow wedge cavity 17 is formed in the light guide plate 10, when light enters the light guide plate 10 through the light incidence surface 11 of the light guide plate 10, the absorption of light energy by the material of the light guide plate 10 is reduced so that the light emitting out of the light exit surface 13 can be of increased brightness thereby increasing image brightness of a display device. Further, due to the reduced loss of light energy, it is possible to reduce the use of light concentration film thereby reducing the cost of a backlight module. Further, since the light guide plate 10 is of a wedge configuration, it helps light to concentrate toward a middle of the light guide plate 10 and may increase the surface area of the light incidence surface 11 to help guide light into the hollow wedge cavity 17 of the light guide plate to improve light utilization.

Figure 3:
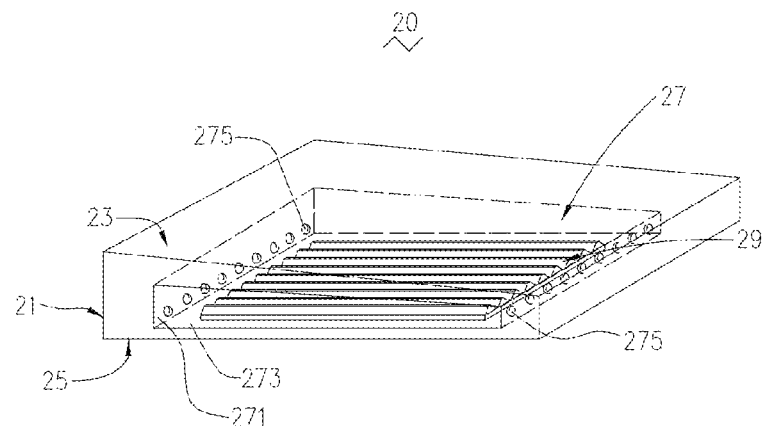
FIG. 3 is a schematic view showing the structure of a light guide plate according to a second preferred embodiment of the present invention.

As shown in FIG. 3, a second preferred embodiment of the present invention provides a light guide plate 20, the structure of the light guide plate 20 provided in the instant embodiment is substantially identical to the structure of the light guide plate 20 of the first preferred embodiment, where the light guide plate 20 comprises at least one light incidence surface 21, a light exit surface 23, and a bottom surface 25; the light guide plate 20 has an interior forming a hollow wedge cavity 27; the light exit surface 23 and the bottom surface 25 are arranged on two opposite surfaces of the light guide plate 20; and the light incidence surface 21 is connected between the light exit surface 23 and the bottom surface 25. The hollow wedge cavity 27 comprises a hollow wedge cavity side surface 271 corresponding to the light incidence surface 21 and a hollow wedge cavity bottom surface 273 connected to the hollow wedge cavity side surface 271. The hollow wedge cavity 27 receives therein a reflector plate 29.

The difference is that in the instant embodiment, the hollow wedge cavity side surface 271 of the hollow wedge cavity 27 is provided with at least one light guide projection 275 projecting inwardly of the hollow wedge cavity 27. In the instant embodiment, the hollow wedge cavity side surface 271 is parallel to or substantially parallel to the light incidence surface 21.

Further, when the light guide projections 275 are hemispheres, the light guide projections 275 have a diameter that is 50 micrometers to 60 micrometers.

Further, the light guide projections 275 are made of the same material as that of the light guide plate 20. Further, the light guide projections 275 and the light guide plate 20 are unitarily formed together.

It is appreciated that the number of the light guide projections 275 used can be determined according to the size of the hollow wedge cavity 27. The light guide projections 275 can be arranged to form multiple rows and multiple columns along a lengthwise direction and a widthwise direction of the hollow wedge cavity side surface 271 so as to form an array composed of the light guide projections 275.

Further, the light guide projections 275 may have a shape of a sphere, a polygonal pyramid, or a polyhedron. It is appreciated that the light guide projections 275 can be of other suitable shapes provided the light guide projections 275 so shaped diffuse and spread light entering through the light incidence surface 21 of the light guide plate 20.

The light guide plate of the instant embodiment comprises light guide projections 275, so that when light gets incident on and enters through the light incidence surface 21 of the light guide plate 20 into the light guide plate 20, the light is diffused and spread by the light guide projections 275 to make light that emits out of the light exit surface 23 of the light guide plate 20 more homogeneous.

A third preferred embodiment of the present invention provides a backlight module, which comprises a light source and a light guide plate 10 as described above according to the first preferred embodiment.

Figure 4:
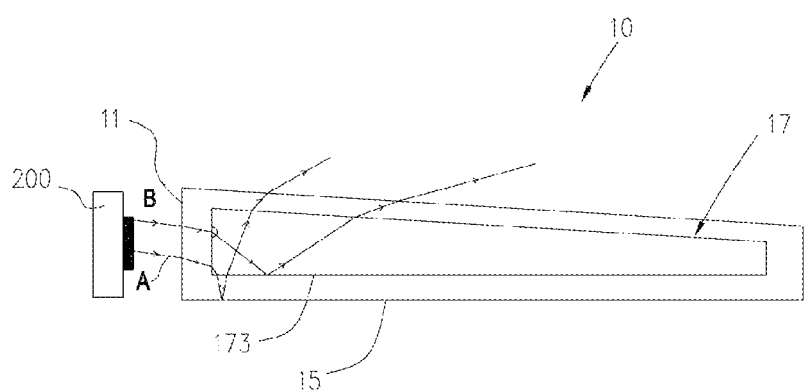
FIG. 4 is a schematic cross-sectional view illustrating the direction of light propagation in a backlight module provided according to a third preferred embodiment of the present invention.

As shown in FIG. 4, the light source of the backlight module is arranged adjacent to the light incidence surface 11 of the light guide plate 10 so that the light source emits light A or light B that enters the light guide plate 10 through the light incidence surface 11 of the light guide plate 10 and, after being reflected by the light guide plate 10, enters the hollow wedge cavity 17 in the interior of the light guide plate 10 to be further subjected to refraction and/or reflection by the hollow wedge cavity bottom surface 173 of the hollow wedge cavity 17 and the light guide plate bottom surface 15 of the light guide plate 10 to then emit out of the light exit surface 13 of the light guide plate 10.

It can be seen that light A or light B, after entering the light guide plate 10 through the light incidence surface 11, during the transmission thereof through the light guide plate 10, since the light guide plate 10 comprises in the interior thereof the hollow wedge cavity 17, the absorption of the light energy thereof by the material of the light guide plate 10 can be reduced thereby increasing image brightness.

Further, compared to light A, light B enters the light guide plate 10 through the light incidence surface 11 and the light, when passing through the curved surface that is formed on the hollow wedge cavity side surface 171 and projects toward the interior of the hollow wedge cavity 17, the direction of refraction of light B changes so that light B can reach a middle portion of the light exit surface 13 to emit outward through only one reflection by the light guide plate bottom surface 15 of the hollow wedge cavity 17 thereby achieving lessened loss of energy when the light reaches the middle portion of the light exit surface 13 and making the brightness at image center sufficient and uniform.

It is appreciated that the propagation directions and the times of light reflection and/or refraction of light A or light B described above are illustrative and the actual propagation directions and times of refraction and/or reflection are determined according to an actual situation.

Further, the light guide plate bottom surface 15 of the light guide plate 10 may be provided with grid dots (not shown) and the grid dots function to reflect light that is projected onto the light guide plate bottom surface 15 toward the light exit surface 13 of the light guide plate 10. Further, the hollow wedge cavity formed in the light guide plate of the backlight module according to the instant embodiment may also be provided therein with a reflector plate.

It is noted here that the light guide plate 10 provided in the above embodiments provides is schematically illustrated to have a light source set on a short edge of the light guide plate 10. Specifically, the light source can be arranged at the left side of the short edge, the right side of the short edge, or both right and left sides of the short edge. Similarly, the light source can be set on a long edge of the light guide plate 10. Specifically, the light source can be arranged at the upper side of the long edge, the lower side of the long edge, or both the upper and lower sides of the long edge. Under this condition, the arrangement of the hollow wedge cavity 17 of the light guide plate 10 is illustrated in FIG. 14 and the direction of the hollow wedge cavity 17 is similar to that shown in FIG. 2 or 3, being perpendicular to the light propagation direction.

Further, the term "left side" and "right side" mentioned above refer to the two side faces of a short edge of the light guide plate 10 and "upper side" and "lower side" refer to two side faces of a long edge of the light guide plate 10. These position related terms are provided based on the illustration of the drawings and are not intended to serve as constraining terms.

In the instant embodiment, the backlight module is a side-edge backlight module. The light source used in the backlight module can be a cold cathode fluorescent lamp tube, a light emitting diode, or other suitable light sources.

The present invention further provides a liquid crystal display device. The liquid crystal display device comprises the above-described backlight module. It is appreciated that the liquid crystal display device can be a liquid crystal panel, an electronic paper, an organic light-emitting diode (OLED) panel, a liquid crystal television, a liquid crystal display, a digital camera, a mobile phone, a tablet computer, or any product or device having a displaying function.

Disclosed above are only preferred embodiments of the present invention, which do not impose undue constraints to the scope of protection of the present invention. Equivalent modifications that are made according to the appended claims are considered within the protection scope covered by the present invention.

What is claimed is:

1. A light guide plate, comprising a light exit surface, a light guide plate bottom surface, and at least one light incidence surface, the light exit surface and the light guide plate bottom surface being opposite to each other, the light incidence surface being connected to the light exit surface and the light guide plate bottom surface, the light guide plate being of a wedge configuration, the light guide plate having an end that is close to the light incidence surface and has a thickness greater than a thickness of an end thereof distant from the light incidence surface, the light guide plate further comprising a hollow wedge cavity, the hollow wedge cavity comprising a hollow wedge cavity bottom surface that is adjacent to the light guide plate bottom surface, the hollow wedge cavity of the light guide plate receiving therein a reflector plate, the reflector plate being laminated on the hollow wedge cavity bottom surface, the reflector plate having a surface facing the light exit surface and comprising reflection projections formed thereon.

2. The light guide plate as claimed in claim 1, wherein the hollow wedge cavity further comprises a hollow wedge cavity side surface adjacent to the light incidence surface, the hollow wedge cavity side surface comprising at least one light guide projection projecting inwardly of the hollow wedge cavity.

3. The light guide plate as claimed in claim 2, wherein the light guide projection and the light guide plate are integrally formed together.

4. The light guide plate as claimed in claim 2, wherein the light guide projection is one of a hemisphere, a polygonal pyramid, and a polyhedron.

5. The light guide plate as claimed in claim 4, wherein the light guide projection is a hemisphere, the hemisphere having a diameter of 50 micrometers to 60 micrometers.

6. The light guide plate as claimed in claim 2, wherein the hollow wedge cavity has a thickness greater than or equal to 2 millimeters.

7. The light guide plate as claimed in claim 2, wherein the light guide plate is made of polymethyl methacrylate.

8. The light guide plate as claimed in claim 2, wherein the light guide plate bottom surface of the light guide plate is provided with a reflection layer.

9. The light guide plate as claimed in claim 1, wherein the light guide projection and the light guide plate are integrally formed together.

10. The light guide plate as claimed in claim 1, wherein the light guide projection is one of a hemisphere, a polygonal pyramid, and a polyhedron.

11. The light guide plate as claimed in claim 10, wherein the light guide projection is a hemisphere, the hemisphere having a diameter of 50 micrometers to 60 micrometers.

12. The light guide plate as claimed in claim 1, wherein the hollow wedge cavity has a thickness greater than or equal to 2 millimeters.

13. The light guide plate as claimed in claim 1, wherein the light guide plate is made of polymethyl methacrylate.

14. The light guide plate as claimed in claim 1, wherein the light guide plate bottom surface of the light guide plate is provided with a reflection layer.

15. A backlight module, comprising a light guide plate, the light guide plate comprising a light exit surface, a light guide plate bottom surface, and at least one light incidence surface, the light exit surface and the light guide plate bottom surface being opposite to each other, the light incidence surface being connected to the light exit surface and the light guide plate bottom surface, the light guide plate being of a wedge configuration, the light guide plate having an end that is close to the light incidence surface and has a thickness greater than a thickness of an end thereof distant from the light incidence surface, the light guide plate further comprising a hollow wedge cavity, the hollow wedge cavity comprising a hollow wedge cavity bottom surface that is adjacent to the light guide plate bottom surface, the hollow wedge cavity of the light guide plate receiving therein a reflector plate, the reflector plate being laminated on the hollow wedge cavity bottom surface, the reflector plate having a surface facing the light exit surface and comprising reflection projections formed thereon.

16. The backlight module as claimed in claim 15, wherein the hollow wedge cavity further comprises a hollow wedge cavity side surface adjacent to the light incidence surface, the hollow wedge cavity side surface comprising at least one light guide projection projecting inwardly of the hollow wedge cavity.

17. A liquid crystal display device, comprising a light guide plate, the light guide plate comprising a light exit surface, a light guide plate bottom surface, and at least one light incidence surface, the light exit surface and the light guide plate bottom surface being opposite to each other, the light incidence surface being connected to the light exit surface and the light guide plate bottom surface, the light guide plate being of a wedge configuration, the light guide plate having an end that is close to the light incidence surface and has a thickness greater than a thickness of an end thereof distant from the light incidence surface, the light guide plate further comprising a hollow wedge cavity, the hollow wedge cavity comprising a hollow wedge cavity bottom surface that is adjacent to the light guide plate bottom surface, the hollow wedge cavity of the light guide plate receiving therein a reflector plate, the reflector plate being laminated on the hollow wedge cavity bottom surface, the reflector plate having a surface facing the light exit surface and comprising reflection projections formed thereon.

18. The liquid crystal display device as claimed in claim 17, wherein the hollow wedge cavity further comprises a hollow wedge cavity side surface adjacent to the light incidence surface, the hollow wedge cavity side surface comprising at least one light guide projection projecting inwardly of the hollow wedge cavity.

* * * * *